(12) United States Patent
Verhoeven

(10) Patent No.: US 7,823,940 B2
(45) Date of Patent: Nov. 2, 2010

(54) DEVICE FOR GRIPPING A FLEXIBLE CONTAINER

(75) Inventor: Antonius Jacobus Maria Verhoeven, Budel (NL)

(73) Assignee: Friesland Brands B.V., Meppel (NL)

( * ) Notice: Subject to any disclaimer, the term of this patent is extended or adjusted under 35 U.S.C. 154(b) by 910 days.

(21) Appl. No.: 10/583,465

(22) PCT Filed: Dec. 17, 2004

(86) PCT No.: PCT/NL2004/000882

§ 371 (c)(1),
(2), (4) Date: Jan. 4, 2007

(87) PCT Pub. No.: WO2005/058706

PCT Pub. Date: Jun. 30, 2005

(65) Prior Publication Data

US 2007/0130884 A1 Jun. 14, 2007

(30) Foreign Application Priority Data

Dec. 18, 2003 (NL) .................................. 1025061

(51) Int. Cl.
*B25J 15/06* (2006.01)
(52) U.S. Cl. .................................................. 294/64.1
(58) Field of Classification Search ........... 294/64.1, 294/65; 414/627, 737
See application file for complete search history.

(56) References Cited

U.S. PATENT DOCUMENTS 3,040,920 A * 6/1962 Harris ....................... 294/64.1
5,271,208 A 12/1993 Christine et al.

FOREIGN PATENT DOCUMENTS

| DE | 102 24 598 | 7/2003 |
| EP | 0 302 221 | 2/1989 |
| GB | 1 450 735 | 9/1976 |
| NL | 6 616 038 | 5/1968 |
| NL | 6 616 039 | 5/1968 |

* cited by examiner

*Primary Examiner*—Paul T Chin
(74) *Attorney, Agent, or Firm*—Abelman, Frayne & Schwab

(57) ABSTRACT

A device for gripping a flexible container, such as a bag filled with fluid, comprising a chamber that is open on one side with a peripheral wall that encloses the open side, a container support that extends in the peripheral direction inside the peripheral wall, as well as an orifice for connecting a vacuum source to the chamber, wherein the chamber can be placed with the open side against the container, such that a vacuum can be generated between the chamber and the container for bringing the container in to contact around the container support transversely to the peripheral direction. The orifice is outside the container support and extends in the peripheral direction.

20 Claims, 2 Drawing Sheets

DEVICE FOR GRIPPING A FLEXIBLE CONTAINER

The invention relates to a device for gripping a flexible container, such as a bag filled with fluid, comprising a chamber that is open on one side with a peripheral wall that encloses the open side, a container support that extends in the peripheral direction inside the peripheral wall, as well as an orifice for connecting a vacuum source to the chamber, wherein the chamber can be placed with the open side against the container, such that a vacuum can be generated by means of the vacuum source between the chamber and the container for bringing the container into contact around the container support transversely to the peripheral direction.

Such a device, which is used for lifting bags, is disclosed in NL-A 6616038. This known device has a box shape that is open on one side. On the inside at the edge of said open side there is a thickening around which the material of a bag can curl to some extent when this bulges out into the box shape under the influence of a vacuum. The bag is filled with a pulverulent or granular material. Because the bag is flexible this can curve inwards to some extent around the container support, such that the device is able to exert a reliable retaining action.

This retaining action is largely based on the friction between the bag and the container support, which is associated with various disadvantages. First of all, since it is dependent on friction, the retaining action is limited. In the event of higher loads or shocks the bag can slip out. The vacuum can also decrease as a consequence of local parting, as a result of which the gripping action is lost. A further disadvantage is that the known device is less adequate in the case of contents that are even less dimensionally stable than a granular material, such as in the case of fluids.

The aim of the invention is therefore to provide a device of the abovementioned type that does not have these disadvantages. Said aim is achieved in that the orifice is outside the container support and extends in the peripheral direction.

The position of the orifice outside the container support leads to various advantages. First of all this position has the advantage that the container can be pulled further over the container support than in the case of the conventional embodiment. If folding of the container over the container support is continued sufficiently far, the retaining force is no longer based solely on friction. The retaining action is now produced in that the container is partially retained by the vacuum itself, against the pull of gravity, when the bag is lifted.

This action can be realised with various types of construction. According to one possible embodiment, the peripheral wall has an inwardly directed flange all round, on the inside edge of which the container support is located. With this arrangement the container support, viewed in the direction transverse to the open side, is preferably within the peripheral wall. The container support is then completely inside the chamber, as a result of which the vacuum can be maintained in a reliable manner. This can be even further improved if, viewed in the direction transverse to the open side, the orifice is closer to the open side than the container support. The container can then also be pulled further over the container support, such that it is bent, for example, through more than 180 degrees.

The orifice can be made in various ways. Preferably, with this arrangement an auxiliary wall extends in the peripheral direction inside the peripheral wall, which peripheral wall and auxiliary wall enclose a space that on one side can be connected to the vacuum source and that on the other side determines the orifice.

The chamber can be delimited on the side opposite the open side by a closed surface, such as a flat plate. The peripheral wall and the auxiliary wall are fixed to this flat plate.

The invention will be explained in more detail below with reference to an illustrative embodiment shown in the figures.

Figure 1:
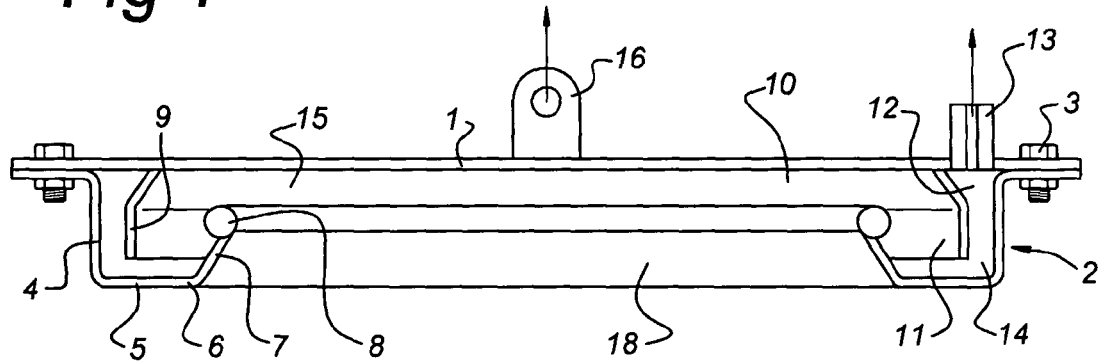
FIG. 1 shows a device according to the invention for gripping a flexible container.

The device according to the invention shown in FIG. 1 is made up of a flat plate 1, to the periphery of which the peripheral wall indicated in its entirety by 2 is fixed. In the illustrative embodiment shown it is shown that the peripheral wall 2 can be fixed by means of a bolted joint 3, but any other manner of joining, such as welding, is also a possibility.

The peripheral wall 2 comprises a wall section 4 running transversely to the flat plate 1, as well as an inwardly directed flange 5 all round. A ring 7, which in this case is conical, is fixed to the inside edge 6 of this flange, the container support 8 then being accommodated on the free end of said ring. This container support 8 is circular in cross-section.

The auxiliary wall indicated by 9 extends inside the peripheral wall. This auxiliary wall has a conical section 10, to which the auxiliary wall section 11 running transversely to the flat plate 1 is fixed.

The connection 13 that can be connected to a vacuum source opens into the space 12 between the peripheral wall 2 and the auxiliary wall 9. On the other side, the peripheral wall 12 and the auxiliary wall 9 delimit an orifice 14, by means of which a vacuum can be generated in the chamber 15 that is located inside the auxiliary wall 9, the flange 5 and the ring 7 with container support 8. An eye 16, by means of which the device can be lifted, is also joined to the flat plate 1.

Figure 2:
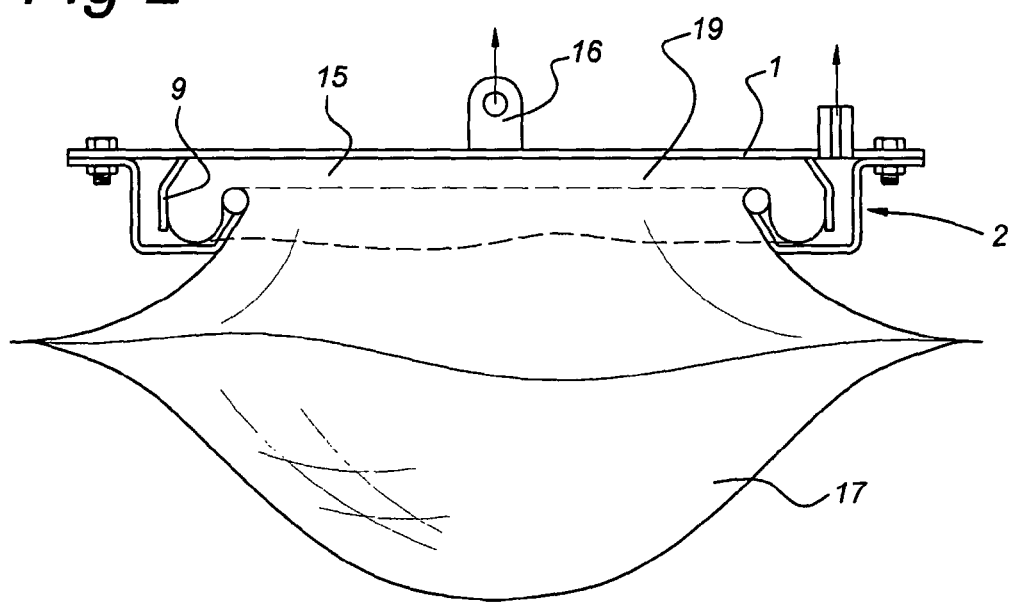
FIG. 2 shows the device in operation, where a bag has been gripped.

The manner in which a bag 17 can be gripped by the device according to the invention is shown in FIG. 2. To this end the device is first of all positioned with its open side 18 against the bag 17. Closing off of the chamber 15 to a certain extent is obtained by this means. A vacuum is then generated in the chamber 15 via the connection 13 and the orifice 14, the upper section 19 of the bag 17 being sucked inwards. During this operation the section 19 comes into contact with the flat plate 1.

Figure 3:
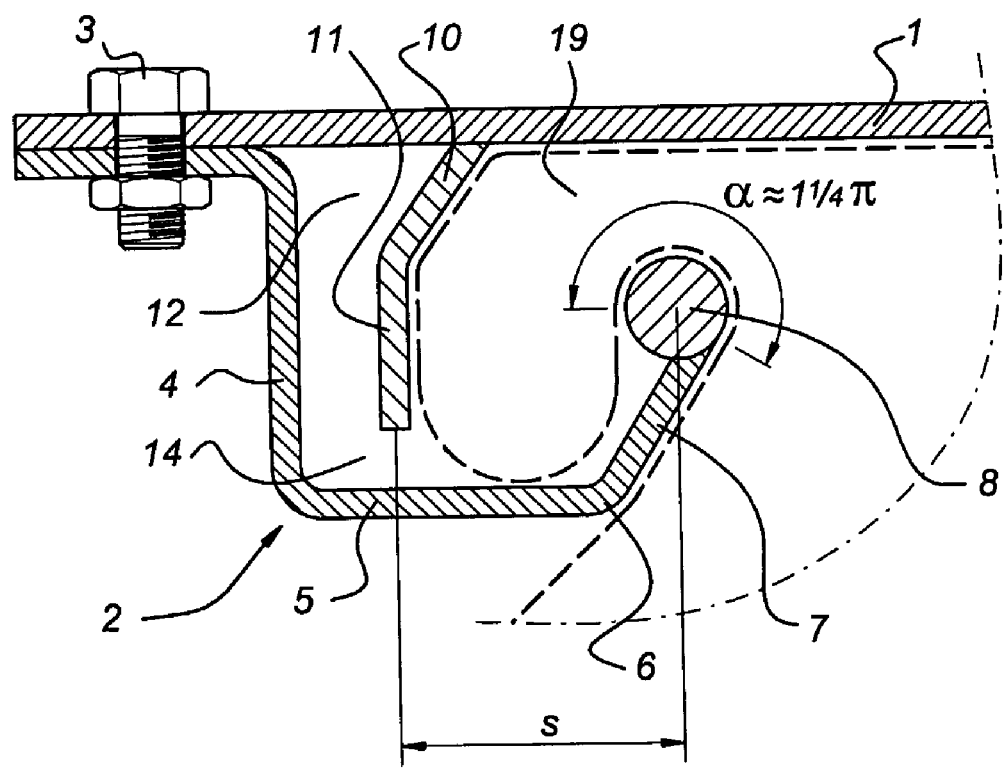
FIG. 3 shows a detail on an enlarged scale and in section of the device with bag.

The way in which the section 19 of the bag 17 curls around the container support 8 is indicated in more detail in the detail in FIG. 3. Since the orifice 14 is at a lower level than the container support 8, the bag is sucked in as far as the space between the auxiliary wall section 11 and the container support 8. The bag is as it were wrapped around the container support 8 and in the illustrative embodiment shown even through an angle $\alpha$ that is greater than 180° and, for example, can be 1¼ $\pi$.

The carrying capacity that is generated depends on the distance s between the auxiliary wall section 11 and the container support 8, the coefficient of friction $\mu$ of the material of the bag 17 and the container support 8, the angle $\alpha$ and the pressure difference p.

The invention claimed is:

1. A device for gripping a flexible container (17) filled with fluid comprising: a chamber (15) that is open on one side (18) having a peripheral wall (2) that encloses the open side (18), a container support (8) that extends in the peripheral direction inside the peripheral wall (2), an orifice (14) for connecting a vacuum source to the chamber (15), wherein the open side (18) is configured for receiving the container (17), such that a vacuum created by the vacuum source is formed between the chamber (15) and the container (17) to draw the container (17) into contact around the container support (8) transversely to the peripheral direction, and wherein the orifice (14) is positioned outside the container support (8) and extends in the peripheral direction.

2. The device according to claim 1, wherein the peripheral wall (2) has an inwardly directed flange (5) all round, on the inside edge (6) of which the container support (8) is located.

3. The device according to claim 1, wherein the container support (8), viewed in the direction transverse to the open side, is inside the peripheral wall (2).

4. The device according to claim 2, further comprising a ring (7) that overlaps the peripheral wall (2) on the inside edge (6) of the flange (5), the container support (8) being positioned on the free edge of the ring (7).

5. The device according to claim 1, wherein, viewed in the direction transverse to the open side (18), the distance between the orifice (14) and the open side (18) is less than the distance from the orifice (14) to the container support (8).

6. The device according to claim 1, wherein an auxiliary wall (9) extends parallel to and inside of the peripheral wall (2), and wherein the peripheral wall (2) encloses a space (12) that on one side can be connected to the vacuum source and that on the other side defines the orifice (14).

7. The device according to claim 6, wherein the auxiliary wall (9) has an auxiliary wall section (11) oriented transversely to the open side (18).

8. The device according to claim 7, wherein the auxiliary wall section (11) extends beyond the container support (8) towards the open side (18).

9. The device according to claim 7, wherein the auxiliary wall section (11) is a displaced away from the container support (8).

10. The device according to claim 1, wherein the chamber (15) is delimited by a planar surface (1) on the side opposite the open side (18).

11. The device according to claim 1, wherein the container support (8) has a circular cross-section.

12. The device according to claim 1, wherein the container support (8) is dimensioned and configured to receive the flexible container (17) in at least a 180 degree bend.

13. The device according to claim 2, wherein the container support (8), viewed in the direction transverse to the open side, is inside the peripheral wall (2).

14. The device according to claim 3, further comprising is a ring (7) that overlaps the peripheral wall (2) on the inside edge (6) of the flange (5), the container support (8) being located on the free edge of the ring (7).

15. The device according to claim 8, wherein the auxiliary wall section (11) is a displaced away from the container support (8).

16. The device according to claim 2, wherein the chamber (15) is delimited by a flat plate (1) on the side opposite the open side (18).

17. The device according to claim 2, wherein the container support (8) has a circular cross-section.

18. The device according to claim 2, wherein the container support (8) is dimensioned and configured to receive the flexible container (17) in at least a 180 degree bend.

19. The device according to claim 2, wherein, viewed in the direction transverse to the open side (18), the distance between the orifice (14) and the open side (18) is less than the distance from the orifice (14) to the container support (8).

20. The device according to claim 2 wherein an auxiliary wall (9) extends parallel to and inside of the peripheral wall (2), and wherein the peripheral wall (2) encloses a space (12) that on one side can be connected to the vacuum source and that on the other side defines the orifice (14).

* * * * *